Figure 1:
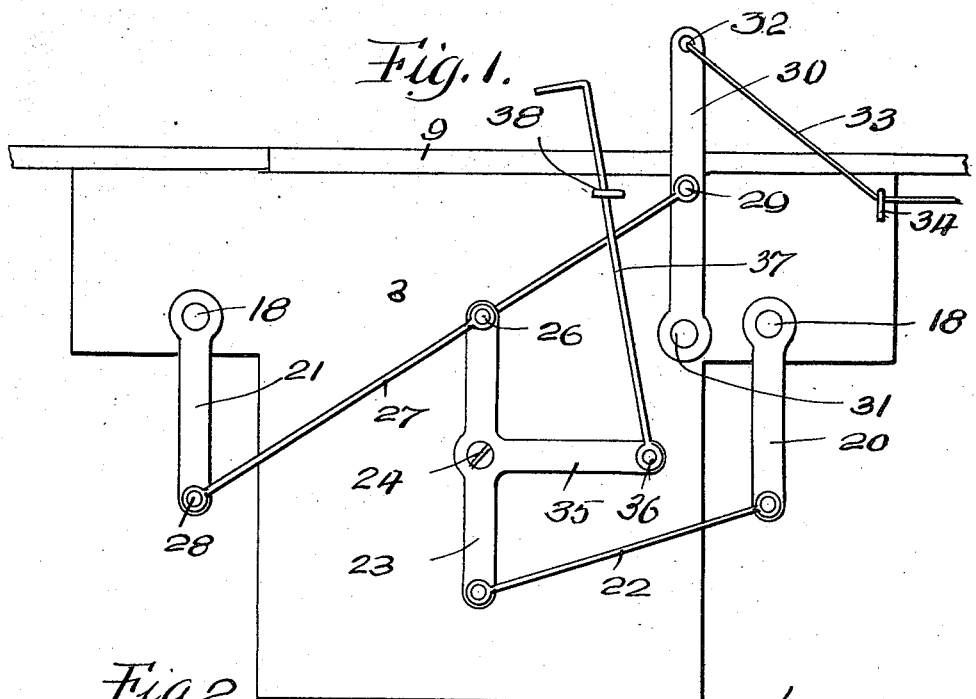

W. P. FRITCHMAN.
TRAP.
APPLICATION FILED AUG. 26, 1911.

1,015,168.

Patented Jan. 16, 1912.

2 SHEETS—SHEET 1.

WITNESSES:
Samuel Payne
Ralph C. Evert

INVENTOR.
W. P. Fritchman
BY
ATTORNEYS.

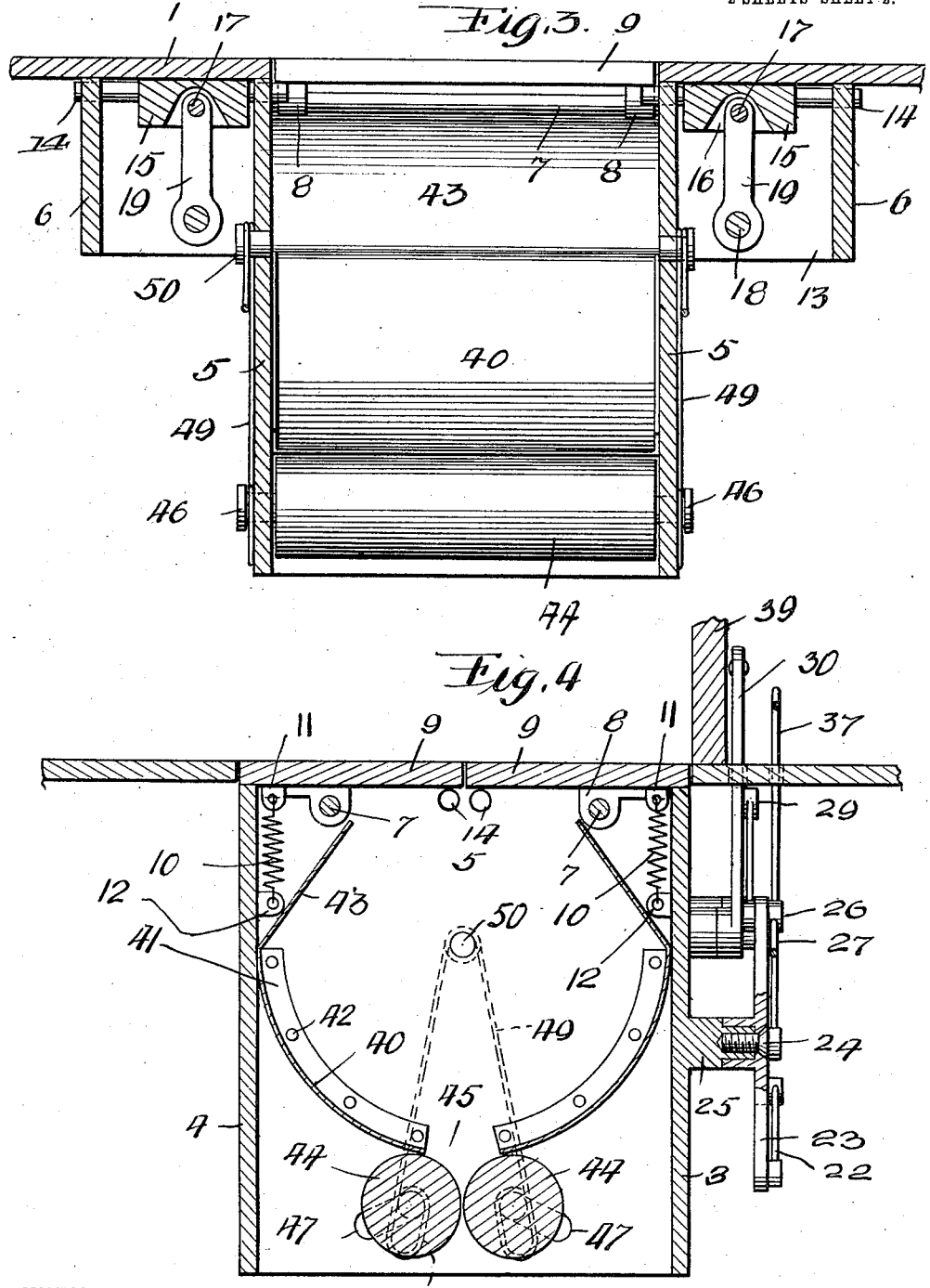

UNITED STATES PATENT OFFICE.

WILLIAM PAGE FRITCHMAN, OF WEST NEWTON, PENNSYLVANIA.

TRAP.

1,015,168.      Specification of Letters Patent.      Patented Jan. 16, 1912.

Application filed August 26, 1911. Serial No. 646,296.

*To all whom it may concern:*

Be it known that I, WILLIAM PAGE FRITCHMAN, a citizen of the United States of America, residing at West Newton, in the county of Westmoreland and State of Pennsylvania, have invented certain new and useful Improvements in Traps, of which the following is a specification, reference being had therein to the accompanying drawing.

This invention relates to traps particularly designed for entrapping burglars and suspicious persons.

The primary object of my invention is to provide a trap that can be advantageously used in banks, mercantile houses, residences and other buildings for entrapping burglars, suspicious persons and others that may have bad intentions or are escaped criminals.

Another object of this invention is to provide a floor or platform with trap doors that can be easily and quickly released to deposit a person in a well where one or both of the limbs are held to prevent the person from escaping.

A further object of this invention is to provide a trap of the above type that can be safely used, installed at a comparatively small expense and used as a safety factor in saving the contents and lives of the occupants of a building.

With the above and other objects in view, the invention resides in the novel construction, combination and arrangement of parts that will be hereinafter specifically described and then claimed.

Reference will now be had to the drawing, wherein:—

Figure 2:
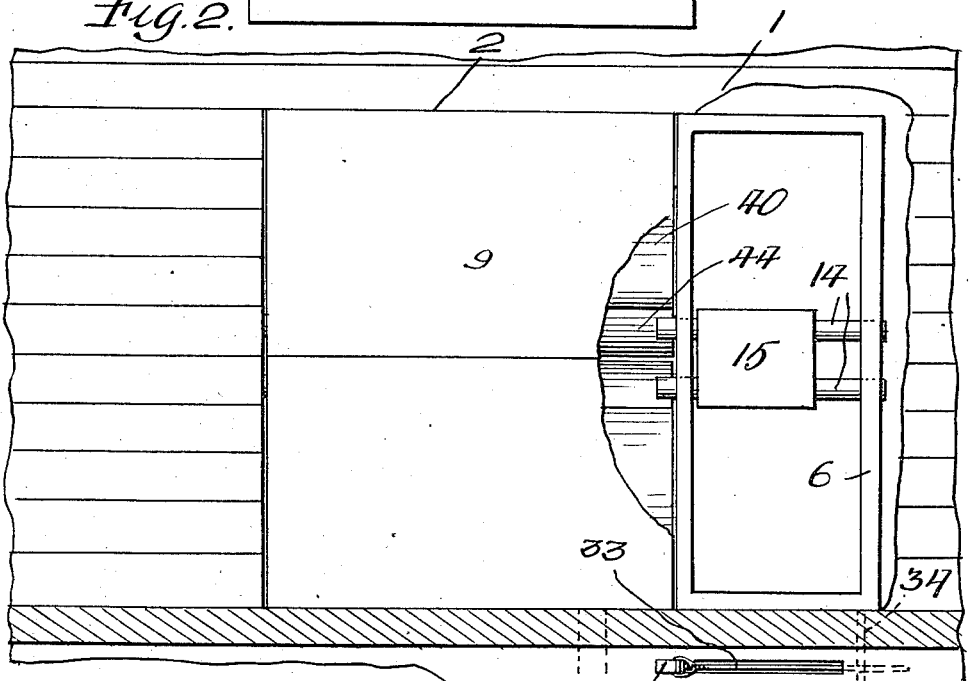

Figure 1 is a side elevation of the trap, Fig. 2 is a plan of the same, partly broken away, Fig. 3 is a longitudinal sectional view of the trap, and Fig. 4 is a cross sectional view of the same.

The reference numeral 1 denotes a floor having a rectangular opening 2 formed therein, and in case the trap is used in a bank, the opening 2 is located in front of the paying and receiving windows while if it is used in a residence, it can be formed in the vestibule or at the head of the stairs. Located beneath the opening 2 is a casing having side pockets, the casing and pockets being formed by side walls 3 and 4 and end walls 5 and 6. Journaled in the end walls 5, adjacent to the upper edges thereof and contiguous to the walls 3 and 4, are shafts 7 and mounted upon these shafts are the bearings 8 of trap doors 9. These trap doors are normally held in a horizontal position with the outer edges thereof resting upon the upper edges of the walls 3 and 4 by coiled retractile springs 10, said springs having the upper convolutions thereof connected to depending apertured lugs 11, carried by the doors 9 and the lower convolutions thereof connected to apertured lugs 12, carried by the inner sides of the walls 3 and 4. Slidably mounted in the walls 5 and 6 of the pockets 13 are sets of rods 14 and the inner ends of these rods are adapted to project into the wall of the casing and support the confronting edges of the trap doors 9. The rods of each set are connected by a block 15 having the under side thereof recessed, as at 16 and provided with a transverse pivot pin 17. Journaled in the side walls 3 of the pockets 13 are rock shafts 18 having fixed cranks 19 within the pockets 13 that are pivotally connected to the pins 17. The ends of the shaft 18 protrude from the wall 3 and are provided with fixed cranks 20 and 21. The crank 20 has the lower end thereof pivotally connected by a rod 22 to the lower end of a bell crank lever 23 pivotally mounted by a screw 24 upon a bearing 25, carried by the side walls 3. The upper end of the bell crank lever 23 is pivotally connected, as at 26 to a rod 27. This rod has the lower end thereof pivotally connected, as at 28 to the lower end of the crank 21, and the upper end of said rod is pivotally connected, as at 29 to an operating lever 30. This lever has the lower end thereof pivotally mounted upon a bearing 31, carried by the side wall 3 and the upper end thereof is apertured, as at 32 whereby a cable 33 can be connected to said lever. The cable 33 extends through a guide eyelet 34, carried by the side wall 3 and when the trap is used in a residence, the cable 33 can extend to a suitable point from where the trap can be safely and quickly operated, for instance at the bed side.

The bell crank lever 23 has the arm 35 thereof pivotally connected, as at 36 to an operating rod 37, which is slidably arranged in an eye 38, carried by the wall 3. The operating rod 37 is arranged whereby it can be pushed or tread upon to move the locking pins 14 from beneath the confronting edges of the trap doors 9, thereby allowing the doors to open by the weight of the person standing upon the doors.

The operating rod 37 and the lever 30 are arranged whereby they can extend upwardly through the floor 1 upon the inner side of a wall 39. Arranged within the well of the casing are curved chutes 40 having side flanges 41 riveted or otherwise secured, as at 42 to the walls 5. The upper ends of the chutes have guards 43 and the lower ends of said chutes terminate above gripping rolls 44 and form a slot 45 directly above the pass of the rolls 44. The rolls 44 have the necks 46 thereof loosely mounted in angularly disposed slots 47 provided therefor in the walls 5, these slots being disposed at an angle whereby the rolls can ride upwardly and downwardly. The rolls are normally maintained in contact by the looped ends 48 of a spring 49 arranged upon the outer side of each of the walls 5. The springs are mounted upon pins 50, carried by the walls 5 and the looped ends 48 surround the necks 46.

In the practice of my invention, it is preferable to arrange a small rug over the trap doors 9, whereby their presence cannot be detected, and should a person step upon the rug and be detected by a cashier as an undesirable person, it would only be necessary for the cashier to tread upon the rod 37, which through the medium of the various cranks and rock shafts 18 immediately withdraws the locking pins 14 and allows the trap doors to open, deposit the rug and the person within the well of the casing. The chutes 40 guide the limbs of the person between the rolls of the well, which recede until the feet have passed through the rolls. Then the rolls snugly engage the limbs and hold the person until captured. The springs 10 restore the trap doors 9 to their normal position and by pulling upon the rod 37, the locking pins 14 can be placed in position to support the trap doors 9 whereby the next customer can be attended to by the cashier. The yieldable rolls 40 can be easily moved to release a person held by said rolls, and the trap in its entirety manipulated in such a manner as not to interfere with the business of the banking house.

What I claim is:—

1. In a trap, the combination with a floor having an opening formed therein, of a casing located beneath said opening, tiltable trap doors arranged in the upper end of said casing and adapted to normally close the opening of said floor, locking pins adapted to normally retain said trap doors in a horizontal position, chutes arranged in said casing, means including rock shafts and cranks adapted to move said locking pins and release said doors, and means including yieldable rolls arranged in said casing and adapted to retain a person therein.

2. In a trap, the combination with a floor having an opening formed therein, of a casing located beneath said opening, trap doors tiltably arranged in the upper end of said casing and adapted to normally close the opening of said floor, chutes arranged in said casing, yieldable rolls at the lower ends of said chutes, and means including locking pins adapted to lock said trap doors in a horizontal position.

In testimony whereof I affix my signature in the presence of two witnesses.

WILLIAM PAGE FRITCHMAN.

Witnesses:
B. R. PETERS,
F. M. GAAL.

---

Copies of this patent may be obtained for five cents each, by addressing the "Commissioner of Patents, Washington, D. C."